United States Patent [19]
Seeley

[11] Patent Number: 6,158,227
[45] Date of Patent: Dec. 12, 2000

[54] MONITORING SYSTEM FOR BEVERAGE CHILLING

[76] Inventor: Eric E Seeley, 12826 SE. 262nd Pl., Kent, Wash. 98031

[21] Appl. No.: 09/182,839

[22] Filed: Oct. 29, 1998

[51] Int. Cl.[7] .................................................. G01K 13/00
[52] U.S. Cl. ................................. 62/56; 62/129; 340/585
[58] Field of Search ............................ 62/129, 130, 125; 340/585, 588; 374/208

[56] References Cited

U.S. PATENT DOCUMENTS

| | | | |
|---|---|---|---|
| 2,169,904 | 8/1939 | Schweller | 62/129 |
| 2,190,574 | 2/1940 | Szush | 62/125 |
| 2,439,509 | 4/1948 | Eddy | 62/130 |
| 2,591,375 | 4/1952 | Radford | 62/1 |
| 2,741,099 | 4/1956 | Reane | 340/585 |
| 2,923,786 | 2/1960 | Jones | 340/585 |
| 3,464,864 | 9/1969 | Rentz | 374/208 |
| 3,594,752 | 7/1971 | Alton | 340/228 |
| 3,959,787 | 5/1976 | Messmann et al. | 340/227 |
| 3,983,753 | 10/1976 | Greenleaf | 374/208 |
| 4,305,289 | 12/1981 | Cornelison | 73/363.7 |
| 4,358,932 | 11/1982 | Helfrich, Jr. | 62/126 |
| 4,482,785 | 11/1984 | Finnegan et al. | 179/5 |
| 4,630,449 | 12/1986 | Adams | 62/130 |
| 4,763,112 | 8/1988 | Hsieh | 374/208 |
| 4,800,371 | 1/1989 | Arsi | 340/593 |
| 4,801,922 | 1/1989 | Worrell, et al. | 340/586 |
| 4,855,721 | 8/1989 | Hallett et al. | 340/585 |
| 4,864,283 | 9/1989 | SEto | 340/584 |
| 5,041,816 | 8/1991 | Morrissey | 340/585 |
| 5,262,758 | 11/1993 | Nam et al. | 340/588 |
| 5,482,373 | 1/1996 | Hutchinson | 374/141 |
| 5,927,085 | 7/1999 | Waldman | 62/129 |

FOREIGN PATENT DOCUMENTS 54-58256   5/1979   Japan .

Primary Examiner—William E. Tapolcai
Attorney, Agent, or Firm—R. Reams Goodloe, Jr.

[57] ABSTRACT

A beverage chilling monitoring and alarm device. The temperature sensing, beverage temperature estimating, and remote alarm device is adapted for use in quick chilling beverages in containers, and thus enables one who attempts to quick chill a beverage to avoid a freeze-ruptured container that messily or catastrophically loses some or all of its contents in the freezer. The device senses the temperature of a beverage container, uses a method which estimates the beverage temperature against a predetermined temperature profile, and provides multi-level alarms based on the temperature of the beverage. The apparatus includes a flexible thermal sensor support that is adapted for being detachably and non-invasively affixed to a container. The sensor support is provided in a stretch type or adjustable length material, such as elastic, or a narrow strip which is adjustably fastened around a container via detachably affixible fasteners, preferably via Velcro® brand hook and loop fasteners, or their functional equivalent. A digital thermal sensor is operably supported against a container wall by the flexible thermal sensor support. Data transfer capability is provided between the thermal sensor and the monitoring and alarm circuit. A monitoring and alarm circuit receives the output signal from the thermal sensor, and generates therefrom a monitoring signal, and, when appropriate, one or more alarm signals. When the estimated beverage temperature reaches a first preselected point, a first alarm signal is generated. As the temperature reaches a second preselected point, a second alarm signal is generated. And, as the temperature being sensed reaches a third preselected point, a third alarm signal is generated. An alarm signal is provided by a piezo electric buzzer and by a light emitting diode, or other multi-function audible or visual alarm signal.

25 Claims, 6 Drawing Sheets

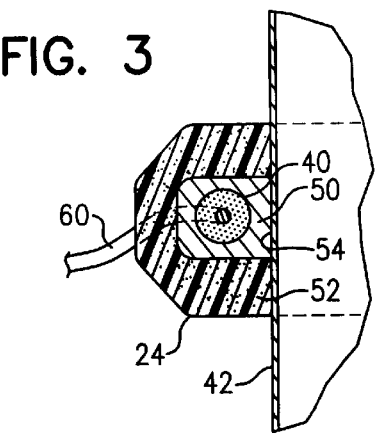
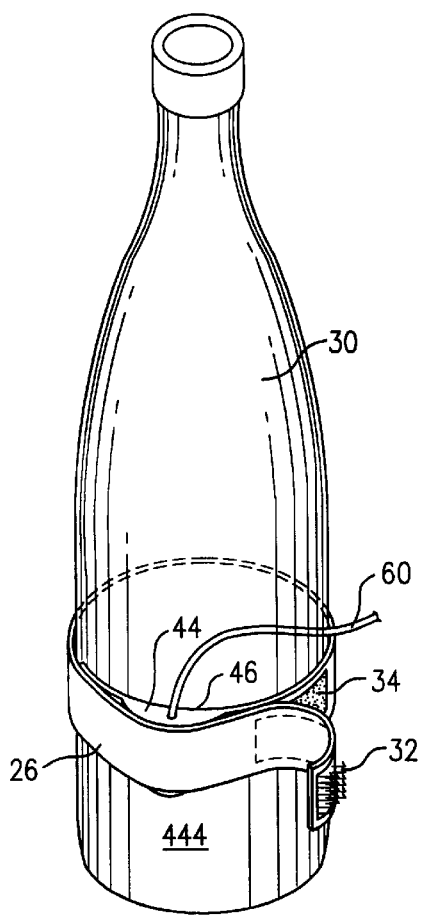
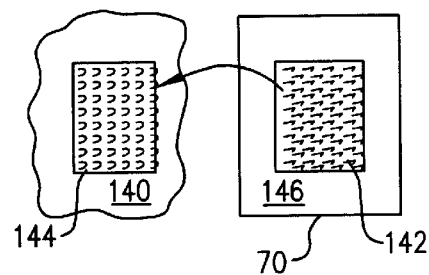
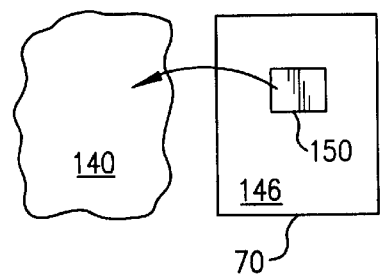
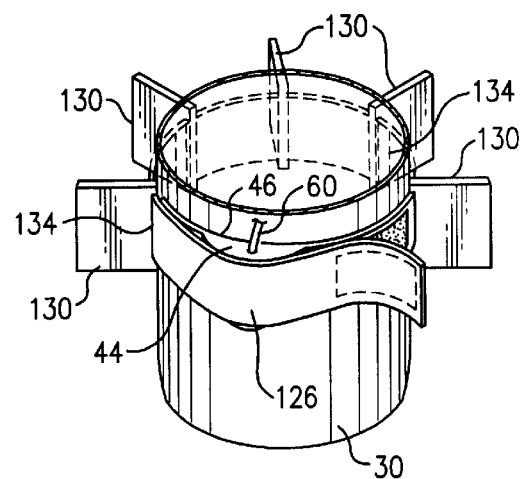

MONITORING SYSTEM FOR BEVERAGE CHILLING

TECHNICAL FIELD

This invention relates to a method and apparatus for sensing the temperature of a container and then estimating or calculating the temperature of the contents of containers, and more particularly, to a novel method and apparatus for sensing and monitoring the temperature profile of beverages during rapid cooling.

BACKGROUND

Various attempts have been made over the years to provide useful and unique devices for monitoring the temperature of liquids while they are chilled in a cooling apparatus such as a refrigerator. One relatively simple device is a direct reading thermochromatic strip affixed to beverage cans, as disclosed in U.S. Pat. No. 5,482,323, issued Jan. 9, 1996 to Hutchinson for a Thermochromatic Indicator for Beverage Containers. Such devices provide a direct temperature sensing feature from the container surface by adhesively affixing the sensing assembly to a beverage container, but they fail to provide any signal (much less a digital signal) for operating an alerting or alarming device which is located external to the cooling apparatus in which the beverage containers are being held. Another type of apparatus, as shown in U.S. Pat. No. 2,741,099, issued Apr. 10, 1956, to Beane for an "Apparatus for Indicating and Controlling the Temperature of Products within Predetermined Limits" solves the problem provides a temperature indicator outside of the cooling device, but compromises the integrity of the seal of the beverage container, since it uses the technique of inserting the temperature sensing device directly into the controlled container of liquid being observed. Neither device solves the problem of providing a direct but non-invasive temperature sensing of a specific beverage container while simultaneously providing an alarm circuit to alert the user to the then estimated degree of chilling then achieved in the container. Such a problem arises in various situations. For instance when it is desired to quickly chill a hot can of beer, or to quickly chill a warm bottle of wine, it would be desirable to provide a reliable indication of the degree of chill actually received. Also, it would be desirable to also provide an alerting signal that the beverage has been adequately chilled, as well as a warning reminder when it becomes time to remove the container from the chilling device. Indeed, in the absence of such a device, beverages placed in chillers, refrigerators, or particularly in freezers, can be forgotten, occasionally with disastrous results, especially in the latter instance.

In any event, it is clear that a continuing need exists for a reliable device than can provide a user with a clear indication that a beverage being chilled has reached a desired low temperature. In short, a continuing demand exists for a simple and inexpensive device to enable a user to prevent the overcooling and thus the freezing of beverages during quick chill operations.

In general, even the currently available "quick chilling" compartments in residential refrigerators which are known to me, such as found in U.S. Pat. No. 4,358,932 issued Nov. 16, 1982 to Helfrich for a "Control System for Refrigerator with Through-the-Door Quick-Chilling Service" have limited capability, since they lack the feature of directly reading the temperature in the container being quickly chilled. More importantly, such a configuration is limited to specially built refrigerators, which adds considerably to their expense, and is adaptable to a portable device which is usable with existing residential refrigerator/freezer combinations. Due to such deficiency, there remains an ongoing need for a highly reliable, low cost device for providing feedback to a user when beverage containers are being quickly chilled. Moreover, there remains an ongoing and as yet unaddressed need for such a device which could be adjusted, reprogrammed, or recalibrated as desired in the event it is used for sensing different beverages, or different types of containers, or different sizes of containers. Finally, in some aspects it would be advantageous if the sensing device were adjustable via computer database file replacement, such as by downloading a controlling program including an appropriate algorithm or set-point parameters and key coefficients (including heat transfer coefficients) from a data bank as may be made available through a private service provider or via "world-wide-web" or "internet" connection capability. In such a manner, a particular device could be provided with a reprogrammable memory function, so that a single device could be used to sense the quick chilling status of a variety of beverages, in a variety of container types, and with a variety of sizes.

SUMMARY

I have now invented, and disclose herein, a novel, unique, and preferably reprogrammable temperature sensing and remote alarm device for use in quick chilling beverage containers. By use of such a device, a beverage container can be exposed to a very cold chilling medium, most commonly air at below freezing temperatures such as in the 0° F. to about 20° F. range, without fear of over-chilling. Importantly, my device eliminates the possibility of a user forgetting the container while it is being chilled, and thus enables one who attempts to quick chill a beverage to avoid a freeze-ruptured container that messily or catastrophically loses some (or all) of its contents in the freezer. Also, my device is affixed directly to a container that is being chilled, a direct calibrated indication of the cooling of the contents in the container is accomplished.

In one embodiment, my novel temperature sensing, monitoring, and multi-function alarm device senses the temperature of a beverage container, uses a method which evaluates the temperature against a predetermined temperature profile, and provides multi-level alarms based on an estimated beverage temperature. The apparatus includes a flexible thermal sensor support that is adapted for being detachably affixed to a container. Preferably such sensor support in a stretch type or adjustable length material, such as an elastic band. Alternately, a thin, narrow strip can be adjustably fastened around a container via detachably affixible fasteners, preferably via Velcro® brand hook and loop fasteners, or their functional equivalent. A thermal sensor is operably supported against a container wall by the flexible thermal sensor support. The thermal sensor provides an output signal, preferably interactive digital signal provided on interrogation, when sensing any pre-programmed and thus preselected temperature. Preferably, the thermal sensor is of the type that is factory calibrated, and thus does not need a field calibration procedure in order to assure proper temperature measurement. However, alternate devices, such as thermistors, RTDs, thermocouples, or the like, can be utilized to still achieve the advantageous results of the present invention. In any event, data transfer capability is provided between the thermal sensor and the monitoring and alarm circuit. A monitoring and alarm circuit receives the output signal from the thermal sensor, and generates therefrom a monitoring signal, and, when appropriate, one or more alarm signals. When the temperature (or a selected mathematical function thereof) reaches a first preselected point, a first alarm signal is generated. As the temperature (or a selected mathematical function thereof) reaches a second preselected point, a second alarm signal is generated. And, as the temperature (or a selected mathematical function thereof) being sensed reaches a third preselected point, a third alarm signal is generated. Then, as the temperature (or a selected mathematical function thereof) being sensed reaches a fourth preselected point, a fourth alarm signal is generated. This process can be continued through an Nth preselected point, to generate an Nth alarm signal; however, I have found that five set points, hand having five distinct alarm signals resulting therefrom, is generally adequate. When using four alarm signals, I prefer to use a single beep when the first setpoint is reached, a double beep when the second setpoint is reached, a triple beep when the third setpoint is reached, a quadruple beep when the fourth setpoint is reached, and a solid tone when the fifth setpoint is reached.

Normally, the monitoring signal is provided via a visual signal, such as with the use of a light emitting diode. The alarm signal is preferably provided with both visual means (such as via use of a light emitting diode) and via aural means, such as a multi-function audible alarm signal.

In summary, my novel beverage temperature sensing, monitoring, and alarm device provides a unique, simple to manufacture, and easy to use device for monitoring degree of cooling of a beverage container, and for notifying the user of a suggested chilling operation endpoint, as well as freezing danger transition point, for beverages that are being rapidly cooled.

OBJECT, ADVANTAGES, AND NOVEL FEATURES

From the foregoing, it will be apparent to the reader that one important and primary object of the present invention resides in the provision of a novel temperature sensing device and alarm generating circuit.

My novel apparatus effectively and detachably secures a temperature-sensing unit to a beverage container to be chilled. It is an object of the invention that the temperature of the beverage being chilled be measured as directly as feasible without compromising the integrity of the container. It is an advantage that my temperature-sensing device is detachably affixed directly against the container being chilled.

Another important object of the invention is to provide an indication to the user that the device is actively sensing the temperature of the beverage container being chilled. It is an advantage that my monitoring and alarm unit provides a visual indication to the user when it is turned on, preferably upon receipt of a signal from the temperature sensor unit.

It is an important advantage and novel feature of my temperature sensing, monitoring, and alarm device that, in one embodiment, it can be reconfigured as desired by reprogramming the microchip logic with data which reflects the cooling temperature profile of a specific beverage type, container type, and specific size, so that the degree of engineering precision employed can be adjusted consistent with the cooling task being conducted.

It is an important advantage and novel feature of my device that in one embodiment, the digital temperature sensor is provided with embedded code transmission capability, so that a microchip, upon receiving such embedded code, performs an estimate of the temperature of the contents of the container, based on the code signal received, which code is specific to indicate the beverage type, container type, and specific size, or other preselected parameters.

It is an important feature of my temperature sensing, measuring, and cooling device that multi-level aural and visual cues are provided for indicating the relationship of the current state of cooling of the beverage to the anticipated endpoint, where cooling is to be discontinued.

Another object my invention is to provide an easy to use enclosure for the temperature monitoring and alarm unit that is simply and reliably affixed to a desired substrate such as an external refrigerator wall.

It is another objective of my invention to eliminate the need for user to repeatedly look inside a freezer which is quick chilling a beverage, and it is an important advantage of my method that energy savings for refrigeration is thus achieved.

It is yet another feature of my beverage temperature sensing, monitoring device that is disclosed and described herein is adaptable for reliable use throughout a range of beverage types, container sizes, and container types, yet can still provide the unique, reliable advantages of positive monitoring of the degree of chill achieved for a specific beverage.

Yet another design objective is flexibility of location and placement of the temperature-sensing device. It is an important feature of my invention that the temperature-sensing device is affixable on a variety of sizes and types of containers with a manually adjustable and reliable yet detachable strap. In this manner, my novel temperature sensing, monitoring, and alarm device may be used with a wide variety of beverage containers.

It is still another important advantage that the location of the temperature-sensing device is not adversely affected by placement at an otherwise desirable location, such as immersed in ice, or in contact with ice or another cold surface.

Yet another important and useful objective of my beverage temperature sensing, monitoring, and alarm unit design is portability. It is an advantage of my invention that the temperature monitoring and alarm enclosure is light in weight, and can be easily transported from a desired operation location and easily transported to a new location for re-installation and continued use, rather than being furnished as a part of the fixed equipment for use with a particular refrigeration unit or at a specific facility. Thus, it is an important advantage and novel feature that my apparatus is provided in a portable design with relatively lightweight materials.

Still another important advantage of my beverage container temperature sensing device is that the container attachment straps are replaceable, so that as wear is experienced over time, the same alarm unit can still be utilized with a replacement attachment strap.

It is also important and a unique advantage of my beverage container temperature sensing device that the temperature sensor is effectively thermally isolated from the surrounding environment, and is substantially exposed only to the container whose temperature is being monitored, rather than to convective cooling within a freezer environment.

It is a still further important feature that my beverage-monitoring device automatically shuts off, to safe battery power, after a preselected period of time during which an "Nth" or final alarm tone is sounded.

It is another important feature that my beverage-monitoring device can utilize a relatively long connection cable, of at least 50 feet, or more, in length.

It is still another important feature that my beverage-monitoring device provides automatic battery power checking, to assure that the device does not become inoperative during a service cycle, and thus helping to assure that a beverage container is not frozen during cooling.

Other important and more specific objects, advantages, and novel features of the invention will become apparent to the reader from the foregoing and from the appended claims, as well as the ensuing detailed description and discussion which proceeds in conjunction with the accompanying drawing.

BRIEF DESCRIPTION OF THE DRAWING

In the drawing:

FIG. 2A shows the use of Velcro brand type hook and loop fasteners to secure an alarm unit against the outer wall of a refrigerator.

FIG. 2B shows the use of a magnet to secure an alarm unit against the outer wall of a refrigerator.

FIG. 3 is a partial vertical cross-sectional view, taken through section 3—3 of FIG. 2, showing a resilient flexible ring mounted against a beverage can surface to hold thereagainst a temperature sensing microchip circuit.

FIG. 4 is a perspective view of a wine bottle having affixed thereto a second embodiment of my temperature sensing device, showing a resilient, generally "comma" shaped temperature sensor bulb detachably affixed to the wine bottle via an elongate, flexible, and preferably integral strip, utilizing detachable fasteners such as Velcro® brand hook and loop type fasteners to secure the strip against the outer surface of the bottle.

FIG. 5 is partial perspective view, taken looking at the lower portion of a wine bottle, around which yet another embodiment of my temperature sensing device is affixed, now showing a resilient, generally "comma" shaped temperature sensor bulb detachably affixed to the wine bottle via an elongate, flexible, and preferably integral strip, utilizing detachable fasteners such as Velcro® brand hook and loop type fasteners to secure the strip against the outer surface of the bottle, and further including a plurality of heat radiating fins adapted to assist in the transfer of heat outward from the contents of the container.

DETAILED DESCRIPTION

Figure 2:
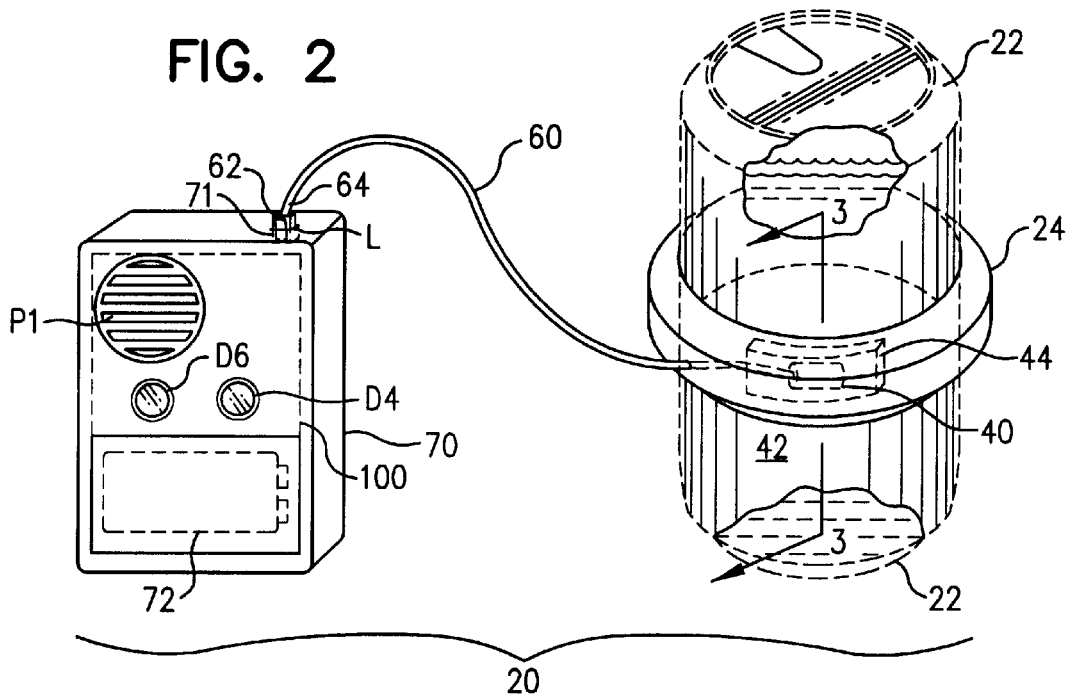
FIG. 2 is also a perspective view of my temperature sensing device with remote alarm, showing in enlarged detail the general layout and use of the apparatus in conjunction with chilling of an unopened beverage in a can.

Referring now to FIG. 2, I have developed a novel and useful temperature-sensing, monitoring, and alarm device 20 which is especially useful for monitoring the cooling progress of quickly chilled beverages, such as a beverage in container 22. My temperature sensing, monitoring, and alarm apparatus 20 includes a flexible thermal sensor support 24 that is adapted for being detachably affixed a container 22. As indicated in the embodiment illustrated in this FIG. 2, the flexible thermal sensor support 24 is preferably a resilient, stretchable, thermally insulative material, such as a substantially hoop shaped rubber band, or stretchable elastic band. Alternately, as indicated in FIG. 4, a different style flexible thermal sensor support 26 can be provided in a narrow band elongate band in either a stretch type or simply an adjustable length of material. In the latter case, the thermal sensor support 26 is adjustably fastened around a container 30 via detachably affixible fasteners, preferably via a Velcro® brand type hook 32 and loop 34 fastener system, or its functional equivalent.

Returning now to FIG. 2, a thermal sensor 40 is operably supported near (although preferably directly against) a wall 42 of container 22. The thermal sensor 40 is urged by the thermal sensor support 24 toward the wall 42. Preferably, a resilient shape adaptive sensor thermal insulator housing 44 is provided for the thermal sensor 40. In other words, the sensor thermal insulator housing 44 is preferably flexible so as to be placed close to or against wall 42 of container 22, in order to provide a stable thermal environment. One suitable material that I have utilized for construction of thermal insulator housing 44 is rubber, and preferably, neoprene type rubber. Ideally, the thermal environment is substantially free of direct convective or conductive heat exchange influence for the thermal sensor 40. Also, as illustrated in FIG. 3, in order to stabilize the sensing environment for thermal sensor 40, I prefer to surround the thermal sensor 40 with thermally conductive material 50, to conduct heat between wall 42 and thermal sensor 40. This is especially useful when the thermal sensor 40 cannot or will not be mounted directly against wall 42. In such a case, the inner ring surface 52 of flexible thermal sensor support 24 is located against surface 42 of container 22, and a shoe portion 54 of the thermally conductive material 50 is form fittingly urged against wall 42.

Figure 1:
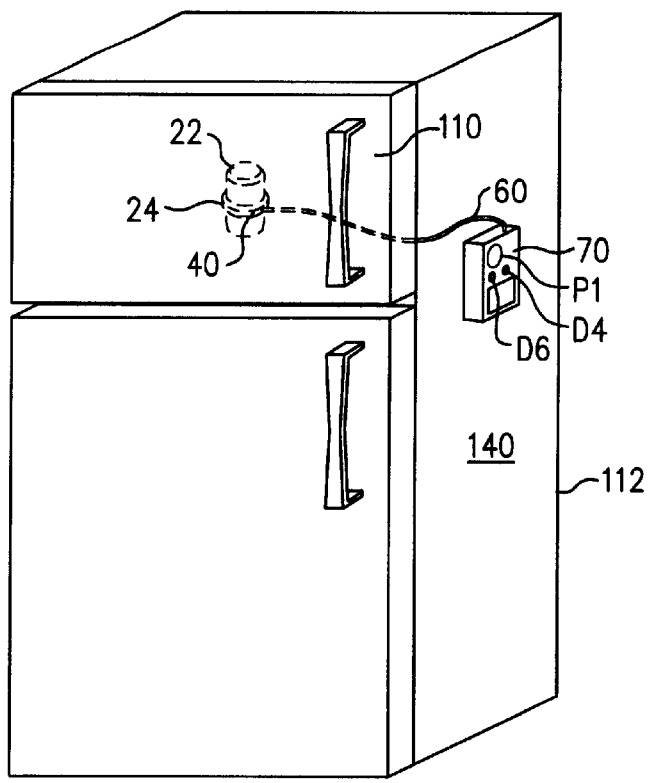
FIG. 1 is a front perspective view of a typical residential refrigerator freezer, showing a beverage container placed in the freezer compartment having attached thereto my novel temperature sensing device with remote alarm.

Thermal sensor 40 provides an output signal, preferably a digital electrical signal, upon interrogation, when sensing any selected preprogrammed temperature. As seen in FIGS. 1 or 2, a data transfer capability such as interconnecting cable 60 is provided between the thermal sensor and the monitoring and alarm circuit unit 70. I prefer to utilize a cable 60 having electrical contacts directly affixed to thermal sensor 40, but with a simple RJ-11 type positive locking plug 62 at the alarm end 64 of cable 60. In any event, the monitoring and alarm circuit (see FIG. 6) in alarm housing 70 receives the output signal (preferably digital signal) from the thermal sensor 40. It is also to be understood that although a data cable 60 has been provided, the thermal sensor 40 can be provided with the capability to also communicate via alternate wire type, via radio frequency (RF), via infrared (IR), via acoustic means, or optical fiber.

In one embodiment of the invention, the RJ-11 locking plug 62 serves as an "on-off" switch. This is accomplished by using an RJ-11 jack receiver 71 in alarm housing 70 in an electrical circuit set up where the ground path is completed only when the plug 62 is inserted in jack receiver 71, thus powering up the apparatus 20. Details of this positive circuit switch set-up can be seen in FIG. 6. Additionally, the positive lock L feature of the standard RJ-11 receiver is desirable, since it reduces the chance that the cable 60 will become unplugged during operation. And, disconnecting the thermal sensor 40 from the alarm housing 70 at plug 62 and jack receiver 71 will remove all power, and thus turn off all power to the apparatus 20.

The alarm housing 70 includes provision for power supply, which can be provided by battery 72, preferably a simple 9-volt battery. However, a miniaturized version would utilize a small "coin" or "button" type battery, instead. It is to be understood, however, that circuitry could be designed to utilize any convenient voltage and power type source, without departing from the teachings herein. For alarm housing 70, I prefer to utilize an off-the-shelf plastic two piece enclosure.

The alarm housing 70 provides housing for a buzzer P1. I prefer to utilize an external oscillator type piezo electric type buzzer P1, however, any suitable audible device could be utilized without departing from the teachings herein.

Figure 6:
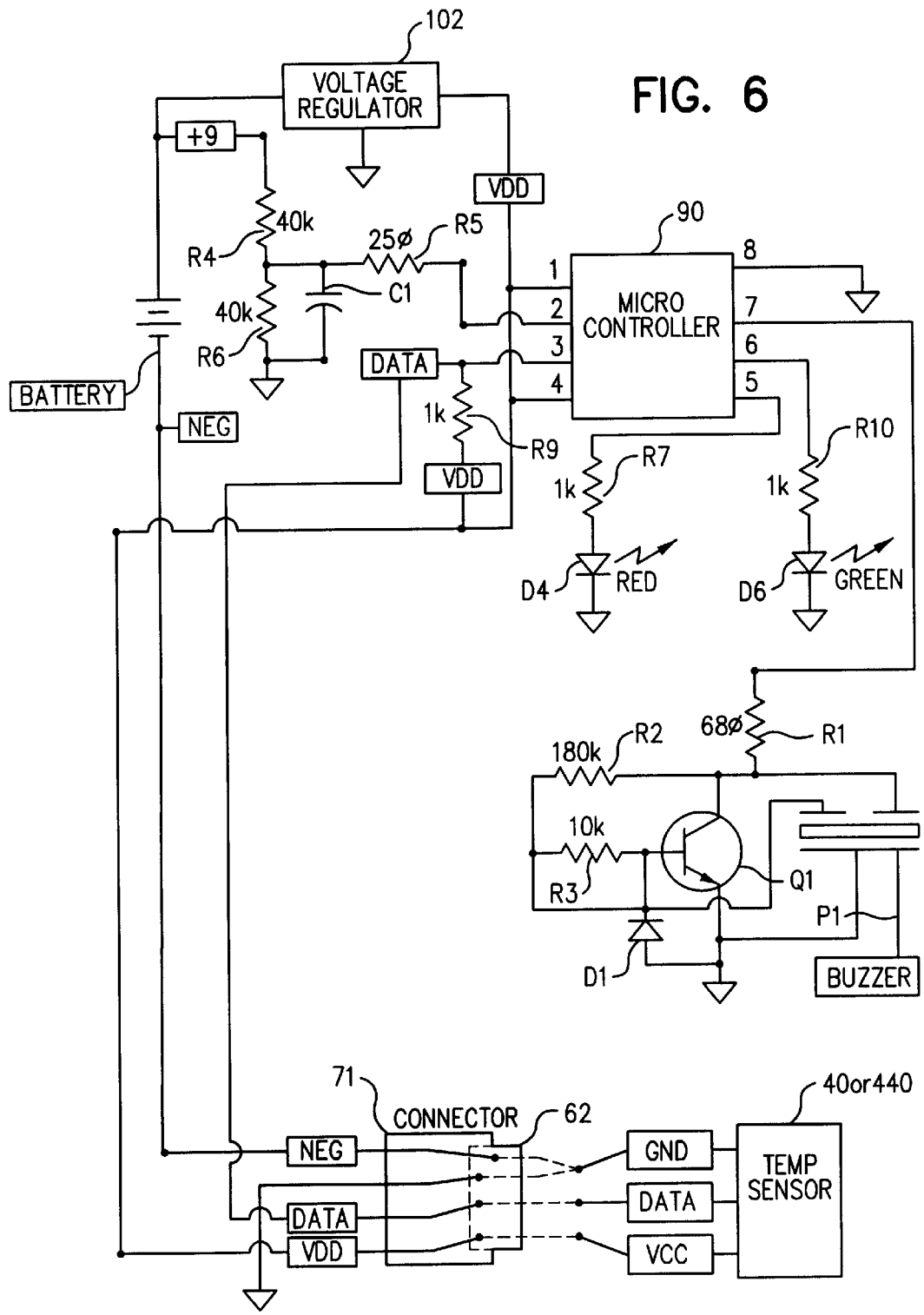
FIG. 6 shows the layout of the discrete circuit elements that enable the operation of one embodiment of my beverage temperature sensing and alarm device.

The alarm housing 70 also provides a location for a first, normally red indicator light D4, and a second, normally green indicator light D6. The second, normally green indicator light D6 is provided to indicate to the user that the apparatus 20 is operating normally. The first, normally red indicator light D4 is preferably provided as a "T 1¾" type, and is used to indicate undesirable conditions, such as a low battery 72, or a failed thermal sensor 40. The flashing characteristics of both the first light D4 and the second light D6 are controlled by the microcontroller 90 as shown in FIG. 6 and as further described hereinbelow.

As indicated in the embodiment shown in FIG. 2, housing 70 also contains a printed circuit board 100, in a single sided FR-4 type board utilizing both surface mount and through-hole components. However, the necessary components could be fabricated as a hybrid microcircuit or other such miniaturized type package, within the teachings hereof. Electrical components placed on board 100 are further described in the schematic provided in FIG. 6. Basically the components include a voltage regulator 102, a microcontroller 90, an external buzzer P1 with oscillator feedback circuit, first and second indicator light emitting diodes D4 and D6, and electrical jack 62. Preferably, all components are surface mounted, except the indicator light emitting diodes D4 and D6, the buzzer P1, and the RJ-11 electrical jack receiver 71. Resistors as indicated are provided in values as indicated in FIG. 6. Diode D1 is type 1N4148, and Q1 is provided as standard type 2N2222. Capacitor C1 is provided in 0.22 uF rating.

In one workable embodiment, my beverage temperature sensing, monitoring, and alarm device 20 utilizes a type12C509 series 8 bit microcontroller 90 available from MicroChip Technology, Inc., of 2355 West Chandler Boulevard, Chandler, Ariz. 85224-6199. In this configuration, the digital thermal sensor 40 is provided utilizing a Model DS1820 from Dallas Semiconductor Corporation, of 4401 South Beltwood Parkway, Dallas, Tex. 75244. The digital thermal sensor 40 provides a digital signal that reflects the real time temperature and thus the subcooling characteristics of a beverage in a container located in a chilling device, such as a beverage 22 located in freezer compartment 110 of refrigerator/freezer 112 as indicated in FIG. 1. Based on temperature setpoints and preselected computational algorithms (either pre-programmed or re-programmable), the apparatus 20 allows a user to confidently utilize the quick chilling capability of a freezer, while decreasing or eliminating the risk of freezing a beverage in a container. Thus, my temperature sending, monitoring, and alarm apparatus 20 enables a user to cool a beverage to a point very near freezing for that particular beverage. Thus, with those beverages containing alcohol, they can be subcooled below the freezing point of water, without freezing the beverage in the container. Note that although my basic device does not keep the beverage in a container from freezing, an optional heater added to the strap would keep the beverage in the container from freezing in the unlikely event the beverage in the container was overchilled.

Figure 7:
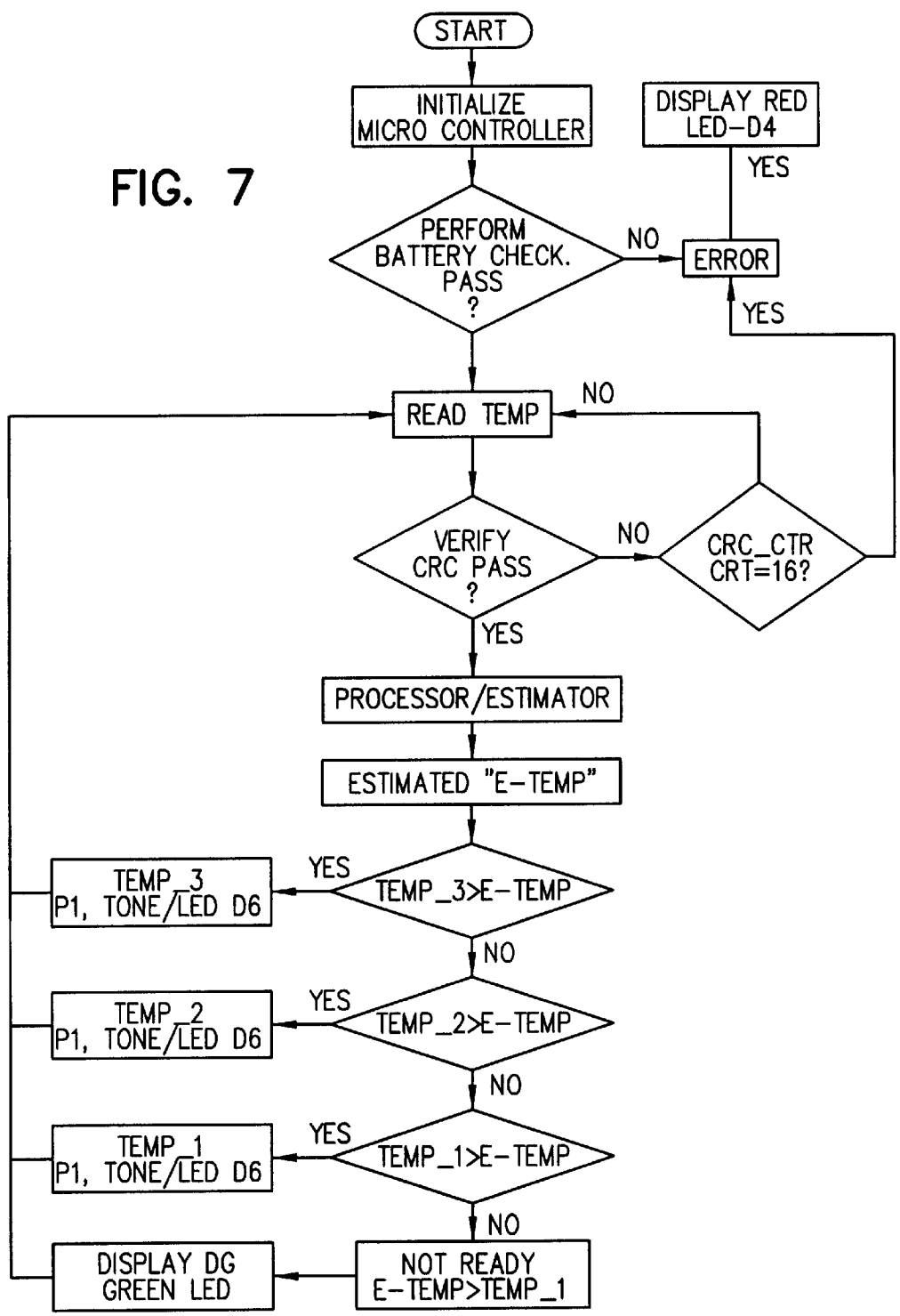
FIG. 7 is a program logic flow chart showing one method of operating my unique temperature sensing, monitoring, and alarm device.

Turning now to FIG. 7, it can be seen that in order to enhance operational effectiveness the apparatus 20 includes, after initialization (which clears the random access memory, flashes the LEDs, and sounds the buzzer to verity that all parts are operational), a built-in battery check step to alert the user to a low batter voltage condition at the time start of operation is attempted. The device logic exits the "No" path, and the device will not operate, if the battery voltage is too low. This is an important feature, since it helps to assure that battery failure will not occur during normal operations. Also, this step alerts the user if the battery is low, or if repeated attempts to read the temperature have failed. Then, to verify accurate digital communication with the temperature sensor 40, a "CRC" or cyclic redundancy check is implemented. This micrologic step is conducted to verify the integrity of the digitally transmitted data, to assure that data received that is suspected of being corrupted is not used to calculate a current estimated temperature of the beverage being cooled. In case passage of the CRC is not achieved, then a new temperature data reading is collected, and the CRC process starts anew. In the event of repeated communications failure (i.e., one that occurs 16 times) the device sounds an audible alarm and the red LED D4 is illuminated.

Once a valid temperature reading is available (having passed the CRC testing), the microchip accepts the temperature data, and from the temperature data, performs a temperature estimating step to provide an "E-temp" or estimated beverage temperature, for further logic processing. The transformation of a "measured" temperature that has been gathered by the temperature sensor 40 to an estimated temperature "E-temp" for the beverage inside a container (the temperature of which cannot be measured directly) is performed by customized estimating algorithms which are further discussed hereinbelow. In any event, a preselected set of threshold temperatures, time or clock history during cooling, or rates of temperature change, etc., can be included in such a transformation algorithm, as well as other factors which directly affect the result, including beverage type, container type, and container size. It is an important feature of this invention that the digital implementation allows different algorithms to be used, or algorithms to be used which vary the processing, depending on embedded code signals received from the thermal sensor. For example, a thermal sensor could be provided for use with a certain size and container type of a particular brand of alcoholic beverage, and another thermal sensor could be provided with a different embedded code, for use with another size and container type of non-alcoholic beverage. Based on the code received, the microprocessor would process the data to estimate different set points, and different final "E-temp" desired.

To facilitate multiple temperature settings (recognizing that various users may desire different end points, or different final temperatures), the apparatus is set up to generate one or more, and preferably a plurality N of alarm signals at N different "E-temp" setpoints; in FIG. 7, three temperature zones are shown, as "Temp_3", "Temp_2", and "Temp_1". If the estimate or "E-temp" temperature exceeds the "warmest" setpoint, namely the "Temp_1" setpoint, then no aural tone will be emitted, and the green LED D6 will blink once every 5 seconds (nominal). When the estimated, "E-temp" temperature reaches a first preselected setpoint "Temp_1", a first alarm signal is generated. This is the warmest setting, at which a single 1-second tone will be emitted after every 120 seconds (nominal) of silence. When the estimated, "E-temp" temperature reaches a second preselected point, a second alarm signal is generated. This is a middle range temperature, at which (nominal) two one-second tones are emitted after every 120 seconds of silence. And, when the estimated "E-temp" temperature developed by the microprocessor reaches a third preselected point, a third alarm signal is generated. This represents a coldest setting, where, preferably, a constant tone will be emitted. Similarly it can be provided that as the estimated "E-temp" temperature reaches a fourth preselected point, a fourth alarm signal is generated. This process can be continued through an Nth preselected point, to generate an Nth alarm signal. However, I have found that five set points, having five distinct alarm signals resulting therefrom, is generally adequate. These particular audible patterns are just for convenience, however and should in no way be considered restrictive. Also, the alarm signal is preferably provided with an aural device such as the buzzer P1 described herein, so that any user within earshot will hear the alerting alarm. However light may also be utilized (such as via use of a light emitting diode D6 as shown in FIG. 7) to provide a multi-function audible and visual alarm signal.

Figure 8:
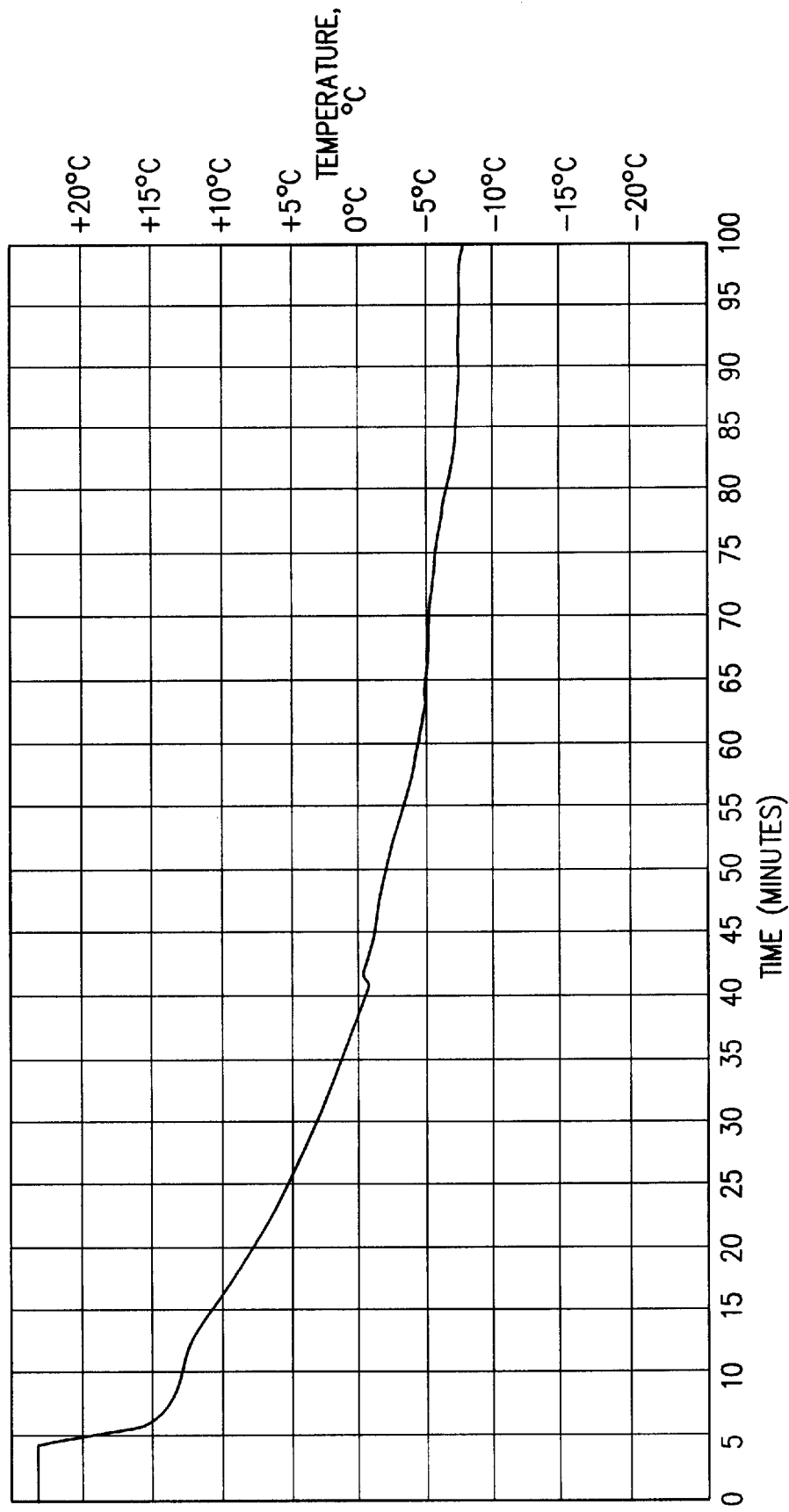
FIG. 8 is a graph illustrating the typical temperature profile associate with the chilling of a beverage.
Figure 9:
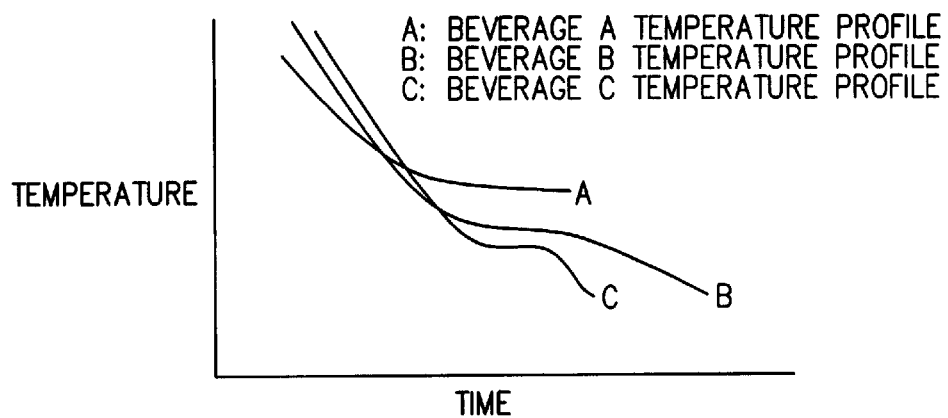
FIG. 9 is a graph illustrating the hypothetical temperature profiles encountered when operating my temperature sensing and alarm device on various beverages.

Turning now to FIG. 8, it can be seen that as a particular beverage is cooled, a plot of time and temperature can be made from the monitored data. As the beverage being cooled reaches closer and closer to its freezing point, the curve flattens out over time. The actual characteristic curve is strongly dependent on the beverage type, container type, and the sensor susceptibility to influences from the freezer environment. However, it is well known that temperature remains relatively stable at the freezing point while liquids experience a phase change and thus become solids. Thus, in evaluating a particular beverage, pre-selected alarm set points can be chosen to reflect the temperature desired. FIG. 9 more clearly sets forth the problem that is faced by the designer of such an apparatus 20, since various beverages have different cooling profiles. As seen in FIG. 9, a beverage A has a cooling curve profile A, which is different from the cooling curve profile B seen with a beverage B, and which is also different from a cooling curve profile seen with a beverage C. Thus, a profile must be selected for programming, or for reprogramming the microcontroller 90, so that the actual temperature estimation algorithm being utilized adequately reflects the actual temperature profile of the beverage being cooled. It is expected that those who are familiar with microcontrollers can accomplish such programming without undue experimentation. In any event, it is fruitless to attempt to set forth herein specifics, since actual algorithms for transforming the measured temperature at the container wall into an estimated temperature of the beverage in the container will, by necessity, vary widely by container type, beverage type, and container size, as well as upon the temperature differentials encountered during cooling.

Importantly, my temperature sensing, monitoring, and alarm apparatus 20 includes a unique flexible thermal sensor support 24 to support thermal sensor 40. As seen in FIG. 2, surrounding the thermal sensor 40 is sensor thermal insulator housing 44, which together are assembled so as to minimize the effects of transient and/or stochastic random thermal fluctuations on the sensing element itself. Also, the flexible thermal sensor support 24 is designed to maximize the thermal contact (heat transfer) between the actual thermal sensor 40 and the container holding the liquid (here, can 22). Also, the sensor thermal insulative housing 44 provides physical, mechanical protection for the thermal sensor 40. Ideally, the thermal insulator strap 24 is flexible and fits circumferentially about the container to be chilled. More preferably, the flexible thermal sensor support 24 urges the thermal sensor 40 tightly toward, and preferably touching, the wall 42 of the beverage container 22 along a circumferential arc of the container. In this manner, a smooth container side surface 46 (see FIG. 10 below) of the sensor thermal insulative housing 44 fits compliantly against the wall 42, to protect thermal sensor 40.

In yet another embodiment as shown in FIG. 5, a flexible thermal sensor support 126 urges the thermal insulator housing 44 toward the container 30 (shown as a lower section of bottle 30 first illustrated in FIG. 4). Also, the flexible thermal sensor support 126 urges additional heat radiating members or fins 130 that act to further increase the rate at which the beverage is cooled, thus increasing the speed at which the beverage is actually cooled. Preferably, fins 130 have an interior portion 132 with a large thermal contact area with container 30, and a large external surface area portion 134 for heat transfer between the fins 132 and the ambient air in the freezer. Fins 132 are best fabricated in a highly conductive material, to increase the rate of cooling of the beverage in the container 30. As illustrated, fins 130 are thin, parallelepiped structures, and preferably rectangular in shape, with a strap receiving aperture defined by a generally rectangular sidewall 134 for receiving the flexible thermal sensor strap therethrough. More preferably, good thermal contact is achieved between the thermal sensor strap and the rectangular sidewall 134.

As indicated in FIG. 1, the preferred location for locating the alarm housing 70 is along an outside surface 140 of refrigerator/freezer 112. This can be achieved by use of a variety of techniques. As shown in FIG. 2A, a Velcro brand type hook 142 and loop 144 fastener can be used, a portion of which is adhesively affixed to the surface 140 and to the rear 146 of alarm housing 70. Alternately, as illustrated in FIG. 2B, a magnet 150 can be affixed to the rear 146 of alarm housing 70, for magnetic attachment to surface 140.

Figure 10:
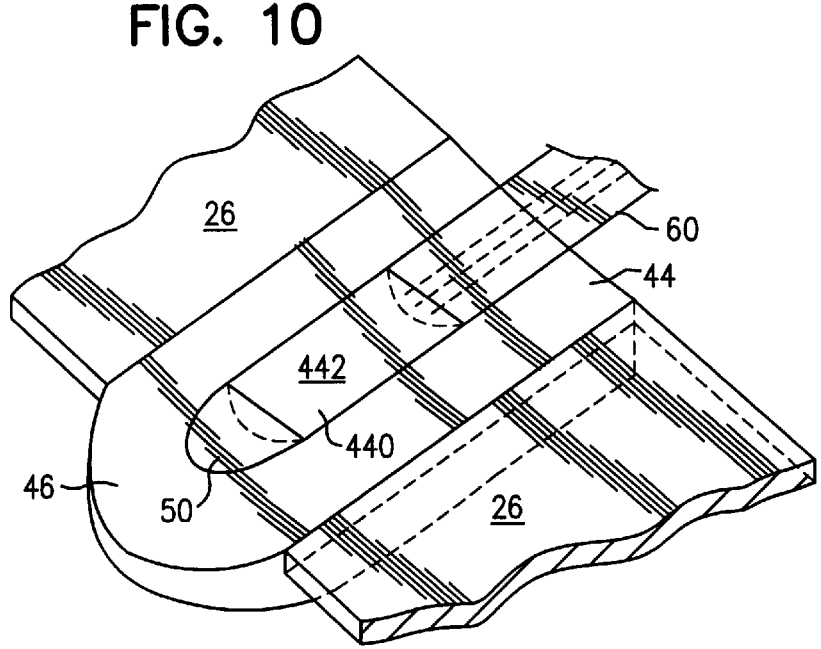
FIG. 10 is a perspective view of a temperature sensor mounted in a thermally insulative housing of the type first illustrated in FIG. 4 or FIG. 5 above.

Finally, as briefly mentioned above, in addition to use with a can 22 as illustrated in FIGS. 1 and 2 above, FIG. 4 illustrates the use of my device with a wine bottle type container 30 having affixed thereto a second embodiment of my temperature sensing device, showing a resilient, generally "comma" shaped thermal sensor housing 44. The thermal sensor housing 44 is detachably affixed to the wine bottle type container 30 via an elongate, flexible, and preferably integral strip, utilizing detachable fasteners such as Velcro® brand hook and loop type fasteners to secure the strip circumferentially around the outer surface of the bottle. It is desirable that the "comma" shaped thermal sensor housing 44 provide a curvature which matches the circumferential curvature of the container 30, so that the smooth, container side, inner surface 46 of the thermal sensor housing 44 provides adequate, and substantially air-flow protected thermal insulation for the thermal sensor 440 as shown in FIG. 10 below. Also, as illustrated FIG. 10, the thermal sensor 440 is provided with a relatively flat, or only slightly curved surface portion 442, which, when oriented substantially axially along the outer surface of a container (as opposed to tangentially), provides a maximum of contact area between the surface portion 442 and the outer wall 444 of container 30.

It will thus be seen that my novel beverage temperature sensing, monitoring, and alarm device provides a unique, simple to manufacture, and easy to use device for estimating the temperature of a beverage being cooled in a container, and for notifying the user of a suggested chilling operation endpoint, as well as freezing danger transition point, for beverages that are being rapidly cooled. Importantly, it can also be seen that the objects set forth above, including those made apparent from the preceding description, are attained in the apparatus described herein. Since certain changes may be made in carrying out the construction of a temperature sensing, monitoring, and alarm device according to the teachings herein, it is to be understood that my invention may be embodied in other specific forms without departing from the spirit or essential characteristics thereof. Many other embodiments are also feasible to attain advantageous results utilizing the principles disclosed herein. Therefore, it will be understood that the foregoing description of representative embodiments of the invention have been presented only for purposes of illustration and for providing an understanding of the invention, and it is not intended to be exhaustive or restrictive, or to limit the invention only to the precise forms disclosed.

All of the features disclosed in this specification (including any accompanying claims, the drawing, and the abstract) may be combined in any combination, except combinations where at least some of the features are mutually exclusive. Each feature disclosed in this specification (including any accompanying claims, the drawing, and the abstract), may be replaced by alternative features serving the same or similar purpose, unless expressly stated otherwise. Thus, unless expressly stated otherwise, each feature disclosed is one example only of a generic series of equivalent or similar features. Further, while certain materials are described for the purpose of enabling the reader to make and use certain embodiments shown, such suggestions shall not serve in any way to limit the claims to the materials disclosed, and it is to be understood that other materials or devices that accomplish substantially the same results in substantially the same way may be utilized in the manufacture of my novel beverage monitoring devices.

The intention is to cover all modifications, equivalents, and alternatives falling within the scope and spirit of the invention, as expressed herein above and in the appended claims. As such, the claims are intended to cover the structures, apparatus, and methods described herein, and not only the equivalents or structural equivalents thereof, but also equivalent structures or methods. The scope of the invention, as described herein and as indicated by the appended claims, is thus intended to include variations from the embodiments provided which are nevertheless described by the broad meaning and range properly afforded to the language of the claims, as explained by and in light of the terms included herein, or the equivalents thereof.

I claim:

1. A temperature sensing, monitoring, and alarm apparatus for sensing temperature of a container and for estimating the temperature of the contents of said container, said apparatus comprising:
   (a) a flexible thermal sensor support, said flexible thermal sensor support detachably affixable to a beverage container;
   (b) a thermal sensor, said thermal sensor supported by said flexible thermal sensor support, said thermal sensor adapted to provide temperature data
   (c) a monitoring and alarm circuit, said monitoring and alarm circuit further comprising
      data transfer capability between said thermal sensor, and said monitoring and alarm circuit;
   (d) said monitoring and alarm circuit responsive to said temperature data from said thermal sensor to provide, as an output, at least one alarm signal, and wherein said monitoring and alarm circuit further comprises a microcontroller, said microcontroller comprising
      a clock timer for generating clock data,
      a master signal generator to generate interrogation signals and to send said master signals to said thermal sensor,
      a data input device for receiving slave data sent by said thermal sensor in response to said master signal sent from said microcontroller, and
      a programmable computational sequence for evaluating said slave data from said thermal sensor and said clock data to generate at least one output signal,
      said at least one output signal operative to indicate a first alarm signal when a preset alarm condition has been computed to have been reached.

2. The apparatus as set forth in claim 1, wherein said monitoring and alarm circuit further comprises a monitoring signal output device.

3. The apparatus as set forth in claim 2, wherein said monitoring signal output device comprises a visual monitoring signal device.

4. The apparatus as set forth in claim 3, wherein said visual monitoring signal device comprises a light emitting diode.

5. The apparatus as set forth in claim 1, wherein said at least one alarm signal comprises an aural alarm signal.

6. The apparatus as set forth in claim 5, wherein said at least one alarm signal comprises a buzzer.

7. The apparatus as set forth in claim 6, wherein said buzzer is a piezo electric type buzzer.

8. The apparatus as set forth in claim 1, further comprising a thermal insulative housing, said thermal insulative housing located between said thermal sensor and said flexible thermal sensor support, effectively insulating said thermal sensor against transitory heating or cooling phenomenon.

9. The apparatus as set forth in claim 8, further comprising, between said thermal sensor and said thermally insulative housing, a layer of thermally conductive material.

10. The apparatus as set forth in claim 1, said apparatus further comprising a plurality of heat radiating fins, said plurality of heat radiating fins each affixed to said flexible thermal sensor support and adapted to be urged against a container, wherein heat in said container is transferred from said container to said fins.

11. The apparatus as set forth in claim 1, wherein said flexible thermal sensor support comprises an elongated flexible strip.

12. The apparatus as set forth in claim 11, wherein said elongated flexible strip further comprises a first attachment portion and a second attachment portion, said first and said second attachment portions detachably affixable so as to detachably secure said flexible strip about the circumference of said container.

13. The apparatus as set forth in claim 1, wherein said flexible thermal sensor support comprises a flexible elastic band, said flexible elastic band adapted to urge said thermal sensor in a tight fitting relationship with said container, along a circumferential arc of said container.

14. The apparatus as set forth in claim 13, wherein said flexible elastic band comprises a one-piece elastic band, and wherein said one-piece elastic band is characterized by the lack of attachment portions, and wherein said one-piece elastic band may be slipped snugly, circumferentially, about said container.

15. The apparatus as set forth in claim 1, wherein said flexible thermal sensor support strip comprises a thin, flexible rubber band, said thin, flexible rubber band adapted to urge said thermal sensor in a tight fitting relationship with said container, along a circumferential arc.

16. The apparatus as set forth in claim 1, wherein said thermal sensor comprises a digital microchip, said digital microchip providing a digital output signal corresponding the temperature of said digital microchip.

17. The apparatus as set forth in claim 1, wherein said microcontroller further comprises the capability to generate a second output signal, said second output signal operative to indicate a second alarm signal when a preset alarm condition has been computed to have been reached.

18. The apparatus as set forth in claim 17, wherein said microcontroller further comprises the capability to generate a third output signal, said third output signal operative to indicate a third alarm signal when a preset alarm condition has been computed to have been reached.

19. The apparatus as set forth in claim 18, wherein said microcontroller further comprises the capability to generate a fourth output signal, said fourth output signal operative to indicate a fourth alarm signal when a preset alarm condition has been computed to have been reached.

20. The apparatus as set forth in claim 1, wherein said microcontroller further comprises the capability to generate a normal condition indicator when the current measured temperature is less than a preselected value.

21. The apparatus as set forth in claim 1, or claim 18, or claim 19, or claim 20, wherein said alarm signal is aural.

22. A method of operating a sensing, monitoring, and alarm system to determine the rapid cooling condition of a beverage in a container being cooled, wherein said method comprises:
   (a) providing a digital thermal sensor, said digital thermal sensor responsive to receipt of a master signal to provide a slave digital temperature;
   (b) providing a microcontroller, said microcontroller comprising
      a clock timer for generating clock data, and
      a master signal generator to generate interrogation signals and to send said master signals to said thermal sensor;
      a data input device for receiving slave data sent by said thermal sensor in response to said master signal sent from said microcontroller;
      a programmable computational sequence for evaluating said slave data from said thermal sensor and said clock data to generate at least one output signal,
   (c) placing said digital thermal sensor against a container;
   (d) operationally effecting said microcontroller to emit said master signal requesting said slave temperature signal from said thermal sensor;
   (e) preselecting a first temperature value;
   (f) activating a first alarm indicator device when said first temperature value is reached.

23. The method as set forth in claim 22, further comprising an additional steps of
   (a) preselecting a second temperature value, and
   (b) activating a second alarm indicator device when said second temperature value is reached.

24. The method as set forth in claim 23, further comprising the additional steps of
   (a) preselecting a third temperature value, and
   (b) activating a third alarm indicator device when said third temperature value is reached.

25. The method as set forth in claim 24, further comprising the additional steps of
   (a) preselecting a fourth temperature value, and
   (b) activating a fourth alarm indicator device when said third temperature value is reached.

* * * * *

UNITED STATES PATENT AND TRADEMARK OFFICE
CERTIFICATE OF CORRECTION

PATENT NO.    : 6,158,227
DATED         : December 12, 2000
INVENTOR(S)   : Eric E. Seely Page 1 of 1

It is certified that error appears in the above-identified patent and that said Letters Patent is hereby corrected as shown below:

<u>Title page,</u>
Item [56] References Cited, U.S. PATENT DOCUMENTS,
After the words "2, 741, 099 4/1956" delete "Reane" and substitute therefore -- Beane --.
After the words "4, 864, 283 9/1989" delete "SEto" and substitute therefore -- Seto --.

<u>Column 5,</u>
Line 61, after the word "profile" delete "associate" and substitute therefore -- associated --.

<u>Column 8,</u>
Line 17, after the word "low" delete "batter" and substitute therefore -- battery --.

<u>Column 11,</u>
Line 67, after the word "temperature" delete "data" and substitute therefore -- data; --.

<u>Column 13,</u>
Line 33, after the words "as set forth in claim 1," delete "or claim 18, or claim 19, or claim 20," and substitute therefore -- or claim 17, or claim 18, or claim 19, --.

<u>Column 14,</u>
Line 24, delete the word "an" and substitute therefore -- the --.

Signed and Sealed this

Twenty-eighth Day of May, 2002

*Attest:*

*Attesting Officer*

JAMES E. ROGAN
*Director of the United States Patent and Trademark Office*